(12) United States Patent
Klinke et al.

(10) Patent No.: US 9,859,774 B2
(45) Date of Patent: Jan. 2, 2018

(54) LINEAR ACTUATOR

(71) Applicant: LINAK A/S, Nordborg (DK)

(72) Inventors: Norbert Klinke, Augustenborg (DK); Michael Lindekilde Randløv, Vojens (DK)

(73) Assignee: Linak A/S, Nordborg (DK)

( * ) Notice: Subject to any disclaimer, the term of this patent is extended or adjusted under 35 U.S.C. 154(b) by 462 days.

(21) Appl. No.: 14/396,227

(22) PCT Filed: Apr. 23, 2013

(86) PCT No.: PCT/DK2013/000031
§ 371 (c)(1),
(2) Date: Oct. 22, 2014

(87) PCT Pub. No.: WO2013/159776
PCT Pub. Date: Oct. 31, 2013

(65) Prior Publication Data
US 2015/0115774 A1    Apr. 30, 2015

(30) Foreign Application Priority Data

Apr. 23, 2012   (DK) ................................. 2012 00279

(51) Int. Cl.
*H01L 41/113*    (2006.01)
*H02K 11/00*    (2016.01)
(Continued)

(52) U.S. Cl.
CPC ............. *H02K 11/001* (2013.01); *A47B 9/04* (2013.01); *G01L 1/16* (2013.01); *G01L 5/0009* (2013.01);
(Continued)

(58) Field of Classification Search
CPC .......... A47B 9/20; A47B 9/04; H02K 11/001; H02K 11/20; H02K 7/06; G01L 1/16;
(Continued)

(56) References Cited

U.S. PATENT DOCUMENTS 7,049,728 B2 *  5/2006  Bastholm ................. A47B 9/20
                                                          310/317
8,539,845 B2 *  9/2013  Schricker ................. G01L 1/16
                                                          73/862.381
(Continued)

FOREIGN PATENT DOCUMENTS

DE    202010015737    5/2011

*Primary Examiner* — Thomas Dougherty
(74) *Attorney, Agent, or Firm* — Dykema Gossett PLLC

(57) ABSTRACT

A linear actuator especially for adjustable furniture comprises a spindle (16) with a spindle nut (16*a*) for bringing about the adjustment of the article of furniture. At the end of the spindle (16) there is a bearing (17) for mounting of this in the actuator. The spindle/spindle nut (16,16*a*) is driven by an electric motor (27) through a transmission (28). For preventing accidents and/or damage during the adjustment of the article of furniture the actuator is equipped with a squeeze protection based on a piezo element (22). This piezo element (22) is arranged in connection with the bearing (17) for registering the forces or deflections of the forces affecting the spindle (16). In that the piezo element (22) has a through-going hole for the spindle the mounting of the piezo element (22) is simplified and further it has turned out that a particularly good signal/noise ratio is obtained.

6 Claims, 5 Drawing Sheets

(51) Int. Cl.
*A47B 9/04* (2006.01)
*G01L 1/16* (2006.01)
*G01L 5/00* (2006.01)
*H02K 7/06* (2006.01)
*H02K 11/20* (2016.01)

(52) U.S. Cl.
CPC .......... *G01L 5/0019* (2013.01); *G01L 5/0071* (2013.01); *H02K 7/06* (2013.01); *H02K 11/20* (2016.01)

(58) Field of Classification Search
CPC ... G01L 5/0009; G01L 5/0019; G01L 5/0071; H01L 41/053; H01L 41/0476; H01L 41/0973; H01L 41/098; H01L 41/277; H01L 41/313; B64C 23/005
USPC ................................................. 310/328, 338
See application file for complete search history.

(56) References Cited

U.S. PATENT DOCUMENTS

| | | | | |
|---|---|---|---|---|
| 9,016,127 B2* | 4/2015 | Saito | ....................... | G01P 15/09 73/493 |
| 9,155,391 B2* | 10/2015 | Klinke | .................... | A47B 9/20 |
| 2014/0000031 A1* | 1/2014 | Westermann | ......... | A61B 5/1115 5/611 |

* cited by examiner

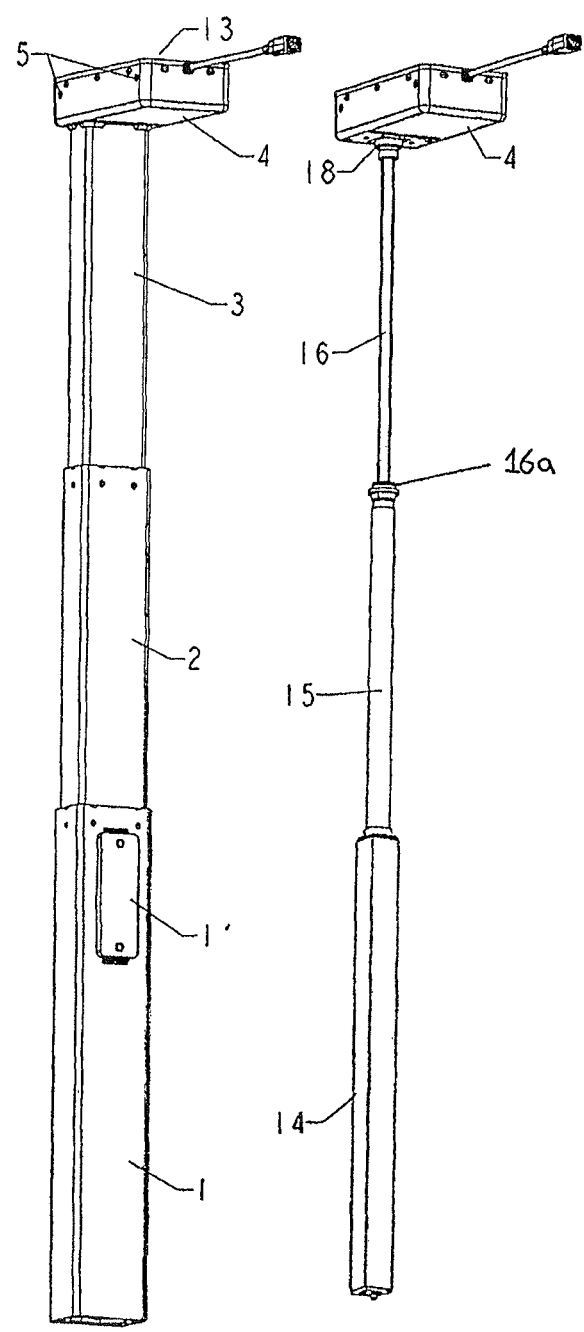

LINEAR ACTUATOR

The present invention relates to a linear actuator with a squeeze protection device based on a piezo element.

Linear actuators e.g. find application in adjustable furniture such as beds, resting chairs and height-adjustable work tables, where it would be critical, if a person was squeezed during the adjustment of furniture. Furthermore, it is unfortunate if the furniture inflicts damage to the surroundings and/or is damaged itself due to the fact that the adjustable element(s) of the furniture during the adjustment hits an infrangible object. As an example of the latter height-adjustable work tables also known as sit/stand tables, where the table top during the adjustment can hit a windowsill or a cable tray designed as a shelf for computer network cabling and/or electric cables.

WO 03056976 A1, Linak A/S discloses a squeeze protection device based on a piezo element. As a first embodiment FIG. 2 shows a drive unit comprising a driven chain running over two chain wheels. Each of the chain runs between the two chain wheels is equipped with a driving rod, which is displaced axially in opposite directions when the chain is moved. At the end of one of the two driving rods a squeeze protection device is mounted comprising a piezo element cf. FIGS. 3 and 4. In another embodiment disclosed in FIG. 5 a linear actuator is shown, where it is briefly mentioned that the piezo element can be placed in connection with a bearing for the spindle without it being specified how the piezo element should be arranged.

DE 20 2010 015 737 U1, Linak A/S discloses a linear actuator with a special embodiment of a squeeze protection device, where a piezo element is surrounded by or embedded in an elastic material. FIGS. 3-4 show an embodiment in the form of a linear actuator for lifting columns for height-adjustable work tables, where the motor as well as a piezo element is embedded in an elastic material. FIGS. 5-6 show an embodiment in the form of a dual actuator for adjustable beds, where the elastic material with the piezo element is located in a small cavity in a wall construction constituting one side of a bearing bush for the bearing on the spindle.

The purpose of the invention is to provide a more concrete solution to the placement of a piezo element in connection with a bearing on a spindle and which further provides a satisfactory signal.

The solution according to the invention is as stated in claim 1 characteristic in that the piezo element has a through-going hole for the spindle. The piezo element can have various geometrical shapes, e.g. square, hexagonal, octagonal, oval etc. It has, however, turned out that a ring-shaped piezo element is particularly expedient. In addition to being easy to mount it has also, not insignificantly, turned out that a particularly good signal/noise ratio is obtained. It is noted that the piezo element per se can be constituted by a piezo electric material, but in a particularly suitable embodiment the piezo element comprises a bearing part, on which there is a piezo electric material. The bearing part can be a metal disc or ring, on which a layer of a piezo electric material is cast. Advantageously, the piezo element is designed as a passive sound generator with a piezo element as a sensor, which is an inexpensive solution, but an active sound generator may of cause also be used, this solution is, however, more expensive. The piezo element can be mounted in various ways e.g. retained by tongues in a recess or by means of glue, but is has turned out that it can be mounted in a very simple manner by means of double adhesive tape.

An embodiment of the invention will be described more fully below with reference to the accompanying drawing, in which:

FIG. 1 shows a linear actuator in the shape of a lifting column,

FIG. 2 shows a drive unit for the lifting column shown in FIG. 1,

Figure 4:
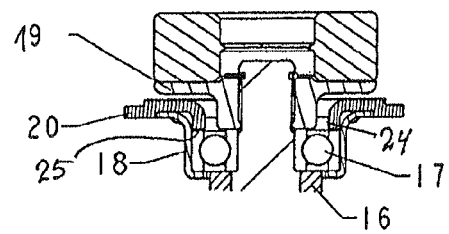
FIG. 4 shows a detailed view of the upper end of the spindle unit in FIG. 3.
Figure 5:
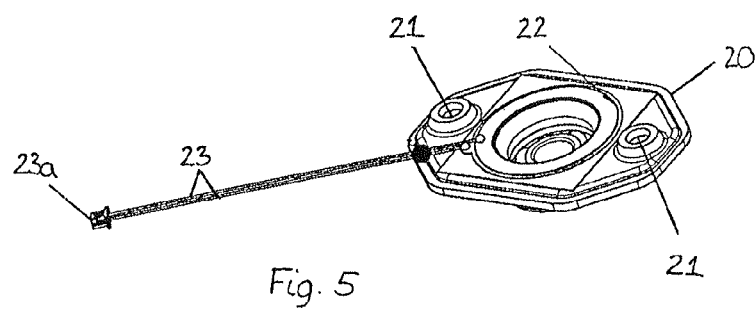
Figure 6:
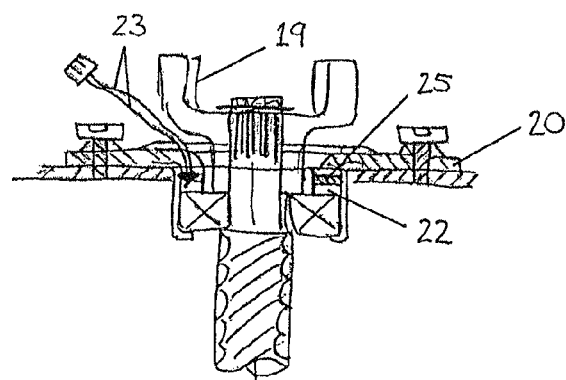
Figure 7:
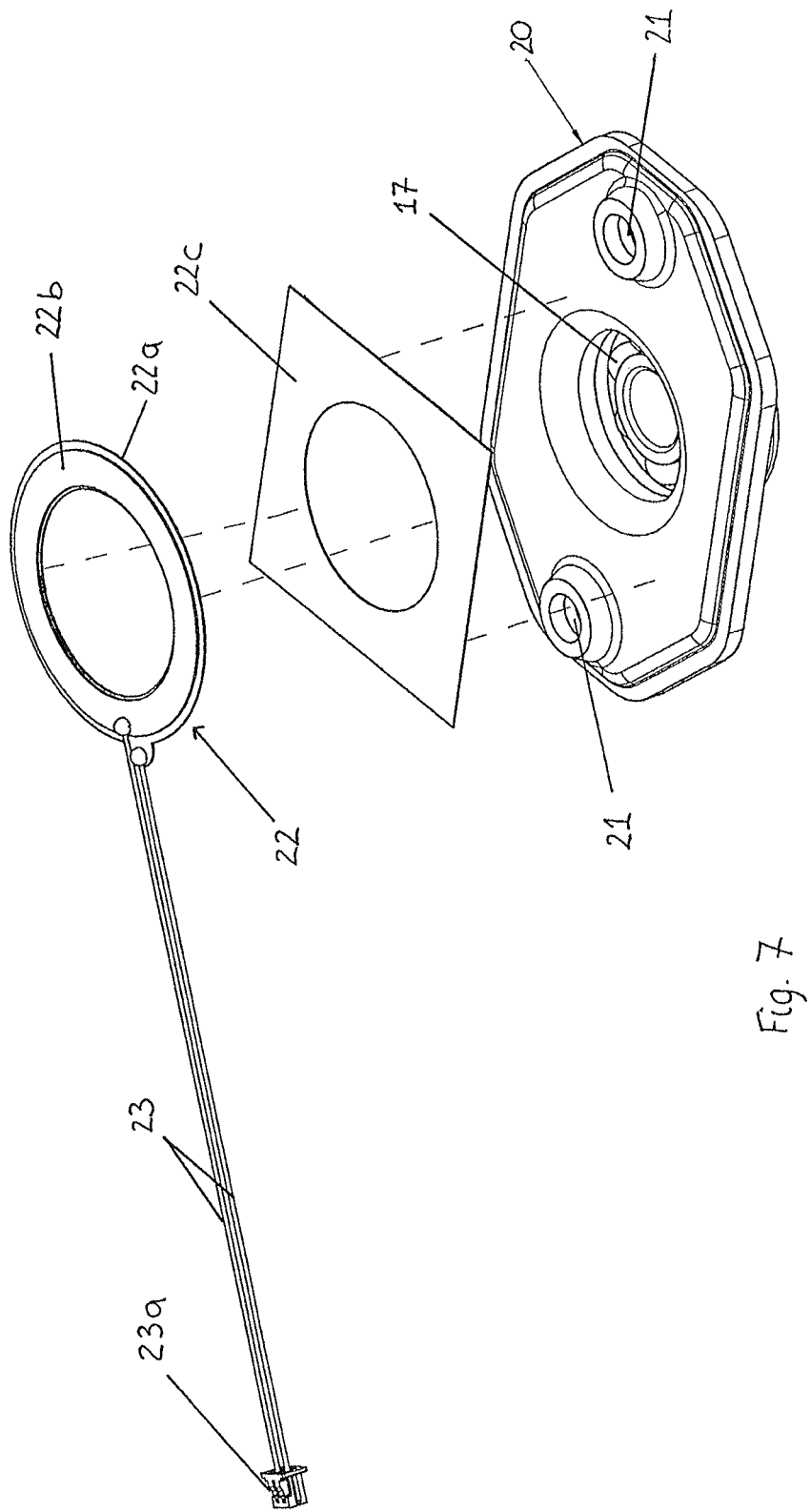
Figure 8:
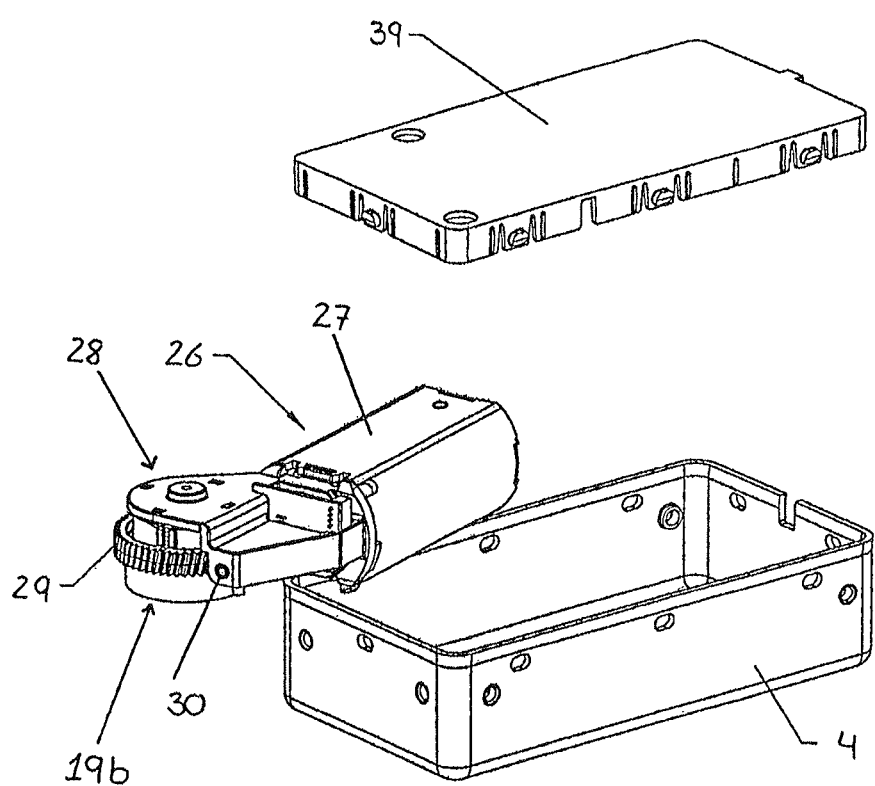
Figure 9:
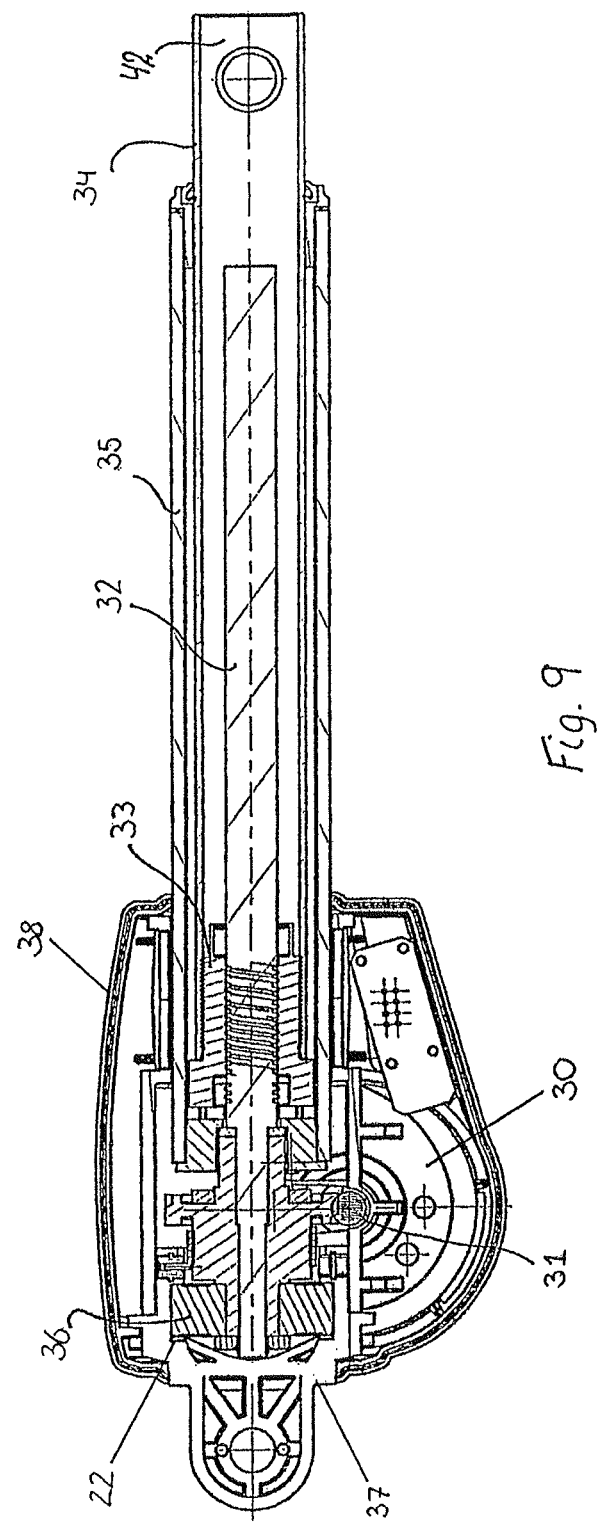

FIG. 5 shows a mounting plate from the upper end of the spindle unit in FIG. 4 equipped with a ring-shaped piezo element, FIG. 6 shows a detailed view of the upper end of the spindle unit equipped with a piezo element biased between the bearing and the mounting plate, FIG. 7 shows an exploded view of the piezo element and mounting plate, FIG. 8 shows an exploded view of the motor unit and housing of the drive unit, and FIG. 9 shows a longitudinal section through a linear actuator.

FIG. 1 of the drawing shows a linear actuator in the form of a lifting column for height-adjustable (sit/stand) tables having three telescopic members 1, 2, 3 arranged inside each other, where the outermost member 1 with its lower end is intended for securing to a foot. At the upper end of the innermost member 3 there is a housing 4, which is located perpendicular to the broad side of the column. The sides and the end of the housing, which are level with the members, are equipped with screw holes 5 for mounting the table top/frame carrying the table top. FIG. 2 of the drawing shows the drive unit of the lifting column.

Figure 3:
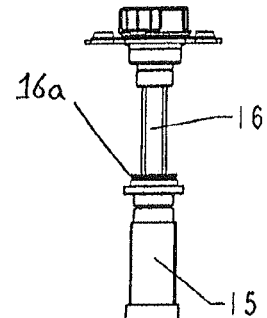
FIG. 3 shows a spindle unit for the drive unit in FIG. 2.

FIG. 3 shows the spindle unit of the drive unit in FIG. 2. The spindle unit comprises an outer tube 14, the lower end of which is retained at the bottom of the outermost member 1. At the top of the tube 14 a coupler with internal threads for a hollow spindle 15 is secured, where the top likewise is equipped with a coupler with internal threads for a solid spindle 16. At the end of the solid spindle 16 a bearing 17, here a ball bearing, is secured surrounded by a bearing bush 18, cf. FIG. 4. At the outermost end of the solid spindle 16 one part 19a of a claw clutch is mounted intended for mesh with the other part 19b of the claw clutch on a motor unit in the housing 4.

The securing of the spindle unit to the housing 4 is carried out by means of a mounting plate 20, which with two screws through screw holes 21 is screwed onto the bottom of the internal side of the housing 4. In that connection it is noted that the upper end of the spindle unit extends through a hole in the bottom of the housing 4.

In the embodiment shown in FIG. 5 the upper side of the mounting plate 20 is fitted with a piezo element 22 constituted by a bearing part in the shape of a metal ring (22a), on which a piezo electric material (22b) is cast. To the piezo electric material is secured two connecting cables 23, with which the piezo element is connected to the control electronics for the lifting column. The piezo element is mounted to the mounting plate 20 by means of double adhesive tape 22c, see FIG. 7. The piezo element registers the bending of the mounting plate 20 as a result of the forces in the lifting column, as the forces are led through the spindle unit via the bearing 17 to the mounting plate 20 and from there to the housing 4. Expediently, the control device is laid out such that the power supply for the motor is cut off in case the piezo element registers a bending corresponding to a force of a given size, which typically originates from the table top hitting an obstacle. The motor can possibly be brought to reverse before it is completely stopped in order for the table top to move a small distance away from the object it has hit.

FIG. 6 shows another embodiment, where the piezo element is biased in connection with the bearing 17. The hole in the mounting plate 20 is here punched and deep drawn, such that it appears with a ring-shaped wall 24 with an edge 25, FIG. 4. The piezo element 22 is located between this edge 25 and the bearing 17. The forces are thus led directly from the bearing to the piezo element and from there to the mounting plate 20. When registering a force which exceeds a given size or a deviation of a deflection of the forces which exceeds a given level the motor is stopped in that the power supply for the motor is cut off.

As it appears from FIG. 8 the motor unit 26 is located in the housing 4. The motor unit 26 comprises a reversible electric motor 27 and a transmission 28 in the form of a worm gear comprising a worm wheel 29 and a worm 30. The other part 19b of the claw clutch is mounted on the worm wheel 29 of the worm gear, to be exact in a cavity of a cylindrical part on the side of the worm wheel.

FIG. 9 of the drawing shows a general-purpose linear actuator, e.g. for adjusting beds, resting chairs, machines, lifts etc. The actuator has an electric motor 30, which through a transmission, here a worm gear 31, drives a spindle 32 with a spindle nut 33. An inner tube 34 surrounded by an outer tube 35 is secured to the spindle nut 33. A bearing 36, here a ball bearing, is secured to the rear end of the spindle 32, said bearing having an outer ring and an inner ring, between which there is a number of balls. The bearing 36 is located in a recess in a rear mounting 37. To be exact the outer ring of the ball bearing 36 rests against a shoulder in the recess. The compression forces on the inner tube 34 are thus transferred directly to the rear mounting 37 via the bearing 36. Between the outer ring on the ball bearing and the shoulder in the recess a ring-shaped piezo element 22 is located for registering the compression forces on the inner tube 34. The cable from the piezo element can relatively easy be guided in a groove intended for that purpose in the rear mounting and is guided to the control electronics for the actuator together with the other cables. As it appears the rear part of the actuator with motor 30, transmission 31 and rear mounting 37 is surrounded by a housing 38. The outer tube 35 is placed such that its rear end extends into an opening in the front end of the housing 38.

Even though the invention here is illustrated in connection with an actuator designed as a lifting column for height-adjustable tables it is understood that the invention is not limited to this. The invention can of cause with advantage be used in other types of actuators e.g. linear actuators for adjustment of hospital and care beds or beds for domestic use.

The invention claimed is:

1. A linear actuator for adjusting an adjustable element of furniture comprising:
   a spindle,
   a spindle nut on the spindle for bringing about an adjustment of the adjustable element of the furniture,
   a bearing on the spindle wherein the bearing is configured to mount the spindle to one of a housing that is mountable to the furniture or a rear mounting of the linear actuator,
   a transmission,
   an electric motor, which through the transmission drives the spindle, and
   a piezo element arranged in connection with the bearing on the spindle for registering the forces affecting the spindle relative to said one housing or rear mounting, and wherein the piezo element has a through-going hole for and through which the spindle passes.

2. The linear actuator according to claim 1, wherein the piezo element is ring shaped.

3. The linear actuator according to claim 1, wherein the piezo element consists of a piezo electric material.

4. The linear actuator according to claim 1, wherein the piezo element consists of a bearing part, on which there is a piezo electric material.

5. The linear actuator according to claim 1, wherein the piezo element is mounted by means of double adhesive tape.

6. The linear actuator according to claim 5, wherein the piezo element is secured to a mounting plate.

* * * * *